United States Patent [19]

Battle et al.

[11] Patent Number: 4,540,204
[45] Date of Patent: Sep. 10, 1985

[54] RESTRAINED PIPE JOINT

[75] Inventors: Billy J. Battle, Birmingham; Robert M. Graham, Bessemer; Lawrence S. Jones, Hueytown; Andrew B. Malizio, Pelham; George F. Rhodes, Leeds, all of Ala.

[73] Assignee: United States Pipe and Foundry Company, Birmingham, Ala.

[21] Appl. No.: 481,690

[22] Filed: Apr. 4, 1983

[51] Int. Cl.³ .............................................. F16L 21/02
[52] U.S. Cl. .................................. 285/231; 285/374; 285/403
[58] Field of Search ............... 285/230, 231, 321, 286, 285/374, 403

[56] References Cited

U.S. PATENT DOCUMENTS

| | | |
|---|---|---|
| 763,542 | 6/1904 | Crawford et al. . |
| 1,072,736 | 9/1913 | Kelly . |
| 1,474,435 | 11/1923 | McWane . |
| 1,474,437 | 11/1923 | McWane . |
| 1,588,444 | 6/1926 | Carson . |
| 3,239,244 | 3/1966 | Leinfelt . |
| 3,433,509 | 3/1969 | Jeffery et al. . |
| 3,480,302 | 11/1969 | Jeffery et al. . |
| 3,684,320 | 8/1972 | Platzer et al. .................. 285/374 X |
| 4,296,953 | 10/1981 | Nagao ............................ 285/374 X |

FOREIGN PATENT DOCUMENTS 3117225 11/1982 Fed. Rep. of Germany ...... 285/374

Primary Examiner—Dave W. Arola
Attorney, Agent, or Firm—James W. Grace; Charles W. Vanecek

[57] ABSTRACT

A bell and plain end pipe joint are provided wherein the plain end has a raised portion on its outside diameter. A series of locking segments fit into a circumferential groove in the bell of one pipe and engage both the raised portion on the plain pipe and a portion of the bell. Upon an increase in fluid pressure in the pipes, the pipes tend to separate axially and the locking segments also contact and bear against a different portion of the bell. The joint provides a novel means of distributing the axial thrust tending to separate the pipe being joined.

4 Claims, 5 Drawing Figures

RESTRAINED PIPE JOINT

BACKGROUND OF THE INVENTION

1. Field of the Invention

The invention is in the field of joining cast ductile iron pipe. More specifically, it is in the field of joining ductile iron pipe in such a manner that they will not separate when subjected to axial loads.

2. Description of the Prior Art

It is common practice to make pipe joints wherein one pipe having a spigot or plain end is pushed into the bell end of another pipe. To prevent leakage a soft rubber ring with a hard rubber insert on one side is placed into the bell of the outside pipe, prior to the insertion of the plain end.

To prevent the pipes from separating under pressure such joints have been modified by using tightening bolts, and tightening plates to connect the pipes. However, these plates and bolts have proven to be costly and complicated to use in the field.

A newer method of connecting such pipes is taught by U.S. Pat. No. 3,684,320. In this patent the outer circumference of the plain end of one pipe has a series supporting elements and the bell end of the other pipe has at least one projection, protruding downwardly towards the inside of the bell. The diameter of the projection is at least equal to the diametric distance between the outer surfaces of the supporting elements so that the plain pipe with its supporting elements can be pushed into the bell end of the other pipe and inwardly beyond the projection. Locking members are inserted between the projection and the supporting elements to lock the pipe together. The locking members are introduced into a recess or recesses in the projection and rotated to engage a portion of the projection and the supporting elements.

In the disclosure of the prior art Patent U.S. Pat. No. 3,684,320 and in actual practice the mating surface of the projection and the locking members have the shape of a spherical shell and both spherical shells have the same diameter. In effect the two surfaces coact in a wedging action so that as the inner and outer pipes are moved apart by the pressure of the internal fluid, the two mating surfaces slide against each other. Since the projection has a slope slanting downwardly in the direction of the open face of the bell and the locking segments have a slope in the same direction, as the pipes tend to move apart, a compressing action takes place between the projection and the locking segment because the locking segment is held tightly against axial movement by the supporting elements.

The compressing action tends to deform the plain end of the inner pipe and will cause the pipe to break, if sufficient radially inward force is applied.

While structures such as those shown in U.S. Pat. No. 3,684,320 provide a means to overcome axial loads on joints of ductile iron pipe up to about thirty-six inches in diameter, since the axial load varies with the square of the diameter, extremely high axial loads must be resisted, when ductile iron pipes of greater diameter are installed. For example, the end load at 500 p.s.i. on a 24 inch inside diameter cylinder with capped ends is about 226,000 pounds, while at the same pressure a 48 inch inside diameter cylinder would have an end load of about 905,000 pounds. The structure of U.S. Pat. No. 3,684,320 allows certain loads to become excessive when his method is used on very large cast ductile pipe.

DESCRIPTION OF THE INVENTION

As will be later described herein, these loads are distributed in a novel manner allowing the pipe structure to withstand them. The novel structure comprises altering the shape of the projection and the locking elements so that as a force is applied greater than the force which would destroy the joint of the prior art, the novel joint provides additional structure to accommodate the greater force. It will also be apparent that, by altering the prior art structure by the novel structure of the invention, higher pressures may be attained for a given pipe wall thickness or thinner pipe walls may be employed to resist a given pressure.

SUMMARY OF THE INVENTION

The invention comprises restraining means for ductile iron push on joint pipe including a weldment on the outside of the plain end of the pipe, a groove and shoulder in the bell of the pipe and locking segments that are installed in the space between the bell groove and shoulder and the plain end. When such pipe are assembled one with another and the locking segments are installed, the locking segments prevent the plain end from being withdrawn since they occupy the space between the bell shoulder and the plain end and thus the weldment cannot move through this occupied space. The locking segments also have a portion that protrudes into the groove on the inside of the bell surface. It is this feature, along with the shape of the components, that permits distribution of the axial forces in a novel manner.

OBJECTS OF THE INVENTION

It is an object of the present invention to provide a novel pipe joint structure which is capable of withstanding great fluid pressures without failure.

It is another object of the invention to provide a novel pipe joint structure which is an improvement over the prior art and yet be easily manufactured without a great departure from accepted pipe manufacturing practice.

It is yet another object of this invention to provide a novel pipe joint structure which has an added feature that acts when the fluid pressure in the joint exceeds a given amount to provide a supplementary locking feature.

BRIEF DESCRIPTION OF THE DRAWING

Other objects and advantages of the present invention will become apparent to those skilled in the art from the following detailed description of the invention taken in conjunction with the accompanying drawing in which like elements are represented by like minerals and in which.

DESCRIPTION OF THE PREFERRED EMBODIMENT

Figure 1:
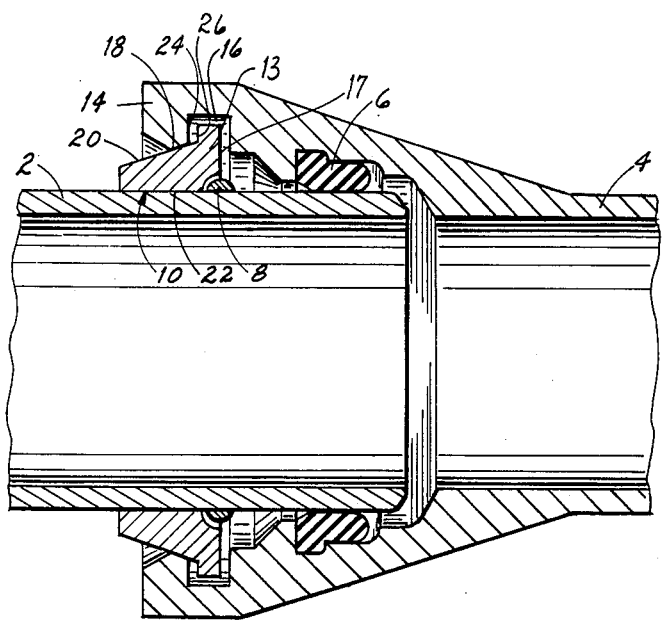
FIG. 1 is a fragmented sectional view of the pipe joint of the invention.

Referring to FIG. 1 of the drawing, there is shown pipe 2 joined to pipe 4 in the novel structure of the invention. Each of pipes 2 and 4 is preferably a ductile pipe made by a centrifugal process, well known in the art, although the invention is not to be limited by the nature of the material of which the pipe is made. The joint between pipes 2 and 4 is sealed by rubber gasket 6 which is compressed between the plain end of pipe 2 and the bell sealing surfaces of pipe 4. A typical joint of this type is illustrated in U.S. Pat. No. 2,953,398 Patented Sept. 20, 1960.

In order to provide a locking action to prevent pipes 2 and 4 from separating axially a combination of a weldment 8, locking elements 10 and a projection 14 are provided. Projection 14 is integrally cast with the end of the bell of pipe 4 and the depending portion of projection 14 is separated from the major remaining portion of the bell by a groove 16. The lower surface 18 of projection 14 facing toward the interior of the bell of pipe 4 is slanted so that it is in the plane of an acute angle with respect to the longitudial surface of plain pipe 2. Generally, the lower surface 18 may be considered to be a section of a cone whose apex would be outside the bell of pipe 4. However, surface 18 could be a portion of a sphere whose center would be inside the bell of pipe 4. Surface 20 will have a similar shape of that of surface 18. Projection 14 at groove 16 has a surface 24 which is perpendicular to the axis of pipe 4. As will be discussed in greater detail hereinafter, surfaces 18 and 24 are arranged to contact mating surfaces of locking segments 10.

Figure 2:
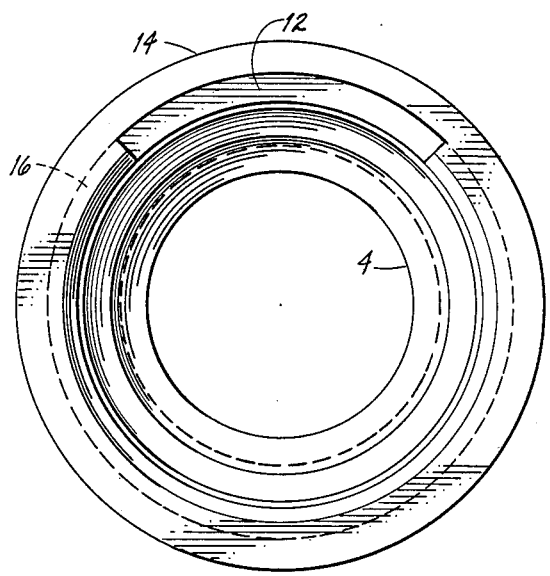
FIG. 2 is an elevational view of the bell of a pipe according to the invention.

FIg. 2 shows an elevation view of the outer face of the bell end and more particularly projection 14 and groove 16, (shown in dotted lines). A recess 12 is cut into projection 14 to permit locking segments 10 to be inserted into groove 16. Recess 12 is longer than a locking segment 10 so that locking segment 10 can be inserted into groove 16 through recess 12.

Figure 3:
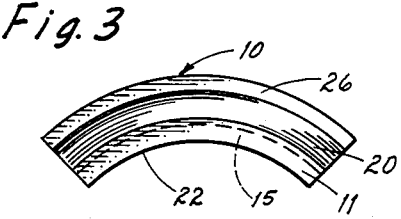
FIG. 3 is a side view of a locking segment according to the invention.
Figure 4:
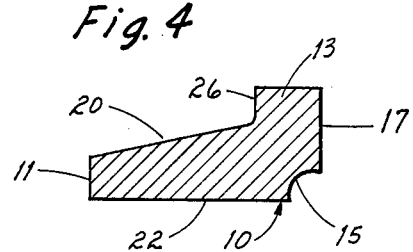
FIG. 4 is a sectional view of a locking element taken along line 4—4 of FIG. 3.

Locking segments 10 are shown better in FIGS. 3 and 4. In FIG. 3 the locking segment 10 is shown as an arcuate piece, preferably of ductile iron whose shape corresponds to the outer diameter of plain pipe 2. As shown in FIG. 3, locking element 10 has an under face 22 which is actually an arc corresponding to the outer diameter of plain pipe 2. Locking segment 10 further has a front leg portion 11 and a body portion 13. Face 25 is one side of body portion 13, while face 17 constitutes the other side of body portion 13. Slant fact 20 connects front leg portion 11 to a face 26 which is perpendicular to the front face of leg portion 11 and rises to meet the top flat part of body portion 13. It should be noted that face 20 is designed to have the same slope as lower surface 18 or slightly less slope as surface 18 of projection 14 and when properly installed surface 18 and face 20 will abut and complement each other. In the case where surface 20 has slightly less slope than surface 18, the two surfaces complement each other only after the slope of surface 18 has been decreased due to the wedging action caused by an axial force tending to separate the two pipe. At its lower right hand edge, locking element has a cut-out portion 15 which is designed to accomodate and mate with weldment 8.

As can be seen in FIG. 1, body portion 13 extends into groove 16 of the bell of pipe 4 but when initially inserted face 26 is slightly spaced from face 24 of projection 14.

A weldment 8 is a bead welded around the circumference in a plane inwardly of the end of plain pipe 2. Weldment 8 is located in a plane which is determined by the relative positions and dimensions of projection 14 and locking segment 10. Weldment 8 may also be a bar welded to the plain end of pipe 2.

In order to assemble the joint between pipes 2 and 4 the gasket 6 is first inserted into its designed groove in the bell end of pipe 4. Plain pipe 2 is pushed into the bell end of pipe 4 until its outer end is pushed beyond gasket 6 to form a fluid tight seal. The outer diameter of weldment 8 is smaller than the open diameter of projection 14 so that weldment 8 clears projection 14 when pipe 2 is inserted into pipe 4. Locking segments 10 are inserted into groove 16 by putting them through recess 12 in projection 14 of the bell of pipe 4 and then rotating them so that they form a ring around the outer surface of plain pipe 2. Weldment 8 acts as a stop to keep locking segments 10 in groove 16.

As the fluid pressure increases the pipes 2 and 4 may tend to disengage because the axial load tends to separate the two pipes but locking segments 10 will abut against weldment 8 and surface 18 of projection 14 will engage surface 20 of locking segment 10. The two surfaces 18 and 20 will fit tightly together in a wedging action as the pressure of the fluid in its pipe increases. This action continues in accordance with the teachings of U.S. Pat. No. 3,684,320.

As the fluid pressure increases further, the joint, if not otherwise protected, may rupture by the bursting of plain pipe 2 under the inward radial force of locking segment 10 or by bursting of the bell of pipe 4 under the equal and opposite outward radial force of locking segment 10.

In the context of the present invention friction between the outside surface of pipe 2 and surface 22 of locking segment 10 may be so great that a large portion of the axial load is resisted by friction and the remainder by the shear load placed upon weldment 8. However, when the axial load becomes large enough, the bell opening of pipe 4 will expand elastically and the pipe will move apart enough to permit bell surface 24 to contact locking segment surface 26, thus transmitting any further load into weldment 8.

Laboratory tests have shown that the preferred embodiment of the invention can resist an axial load that would otherwise either split the bell of pipe 4 or crush the plain end of pipe 2. It is thus important that bell groove 16 be wide enough to contain body portion 13 and to allow axial movement of the pipe after surface 18 contacts surface 20.

In an alternate embodiment, surface 20 of locking segment 10 and the shoulder 18 contacting surface 20 are both spherical surfaces of the same radius, i.e., surface 20 is convex and the surface of shoulder 18 in contact with surface 20 is concave.

Figure 5:
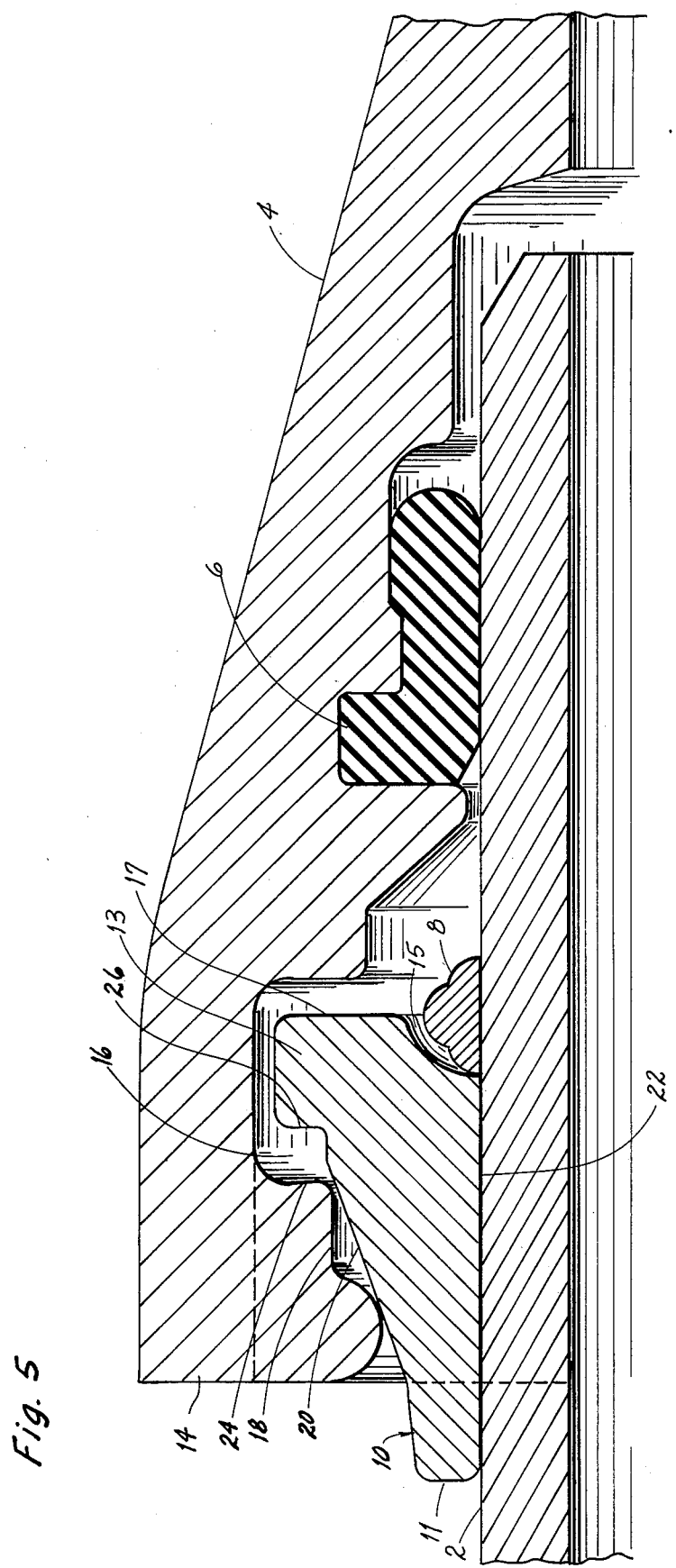
FIG. 5 shows an elevational view of an alternative structure of the invention.

For very large diameter pipes, such as 54", The configuration of the surface 18 of projection 14 may be changed so that only a two point contact is used between surface 18 and face 20 of locking segment 10. This alternative structure is shown in FIG. 5. If the two rounded points of the contour are connected with a straight line, the angle formed with the horizontal is slightly greater than the angle formed by surface 20 of locking segment 10. Since all surfaces are as cast, i.e., not machined, this combination of unequal angles helps assure that surfaces 18 and 20 will engage over 360° prior to the contact between faces 24 and 26.

The present embodiments of this invention are illustrative and should not be considered as restrictive, the scope of the invention being indicated by the appended claims.

We claim:

1. In combination a first pipe in locking, overlapping engagement with a second pipe and means to lock the two pipes together, said means comprising:
   a. said first pipe having a bell portion, said bell portion having a radially, inwardly, circumferentially extending projection integrally mounted to said bell portion at one end of said first pipe, said projection forming one end of a circumferential groove, said projection having a first surface remote from said bell portion facing toward the interior of said first pipe and forming a first contacting surface; said projection further having a second surface connected to said first surface and extending radially of said bell portion to form one wall of said elongated circumferential groove, said projection having an arcuate, circumferentially shaped recess, said recess providing an opening into a portion of said elongated circumferential groove,
   b. a plurality of arcuate shaped locking segments corresponding in shape to said arcuate shaped recess in said projection and conforming to the outer circumference of said second pipe, each of said segments having a leg portion and a body portion; said leg portion having a contacting surface, and said body portion having a contacting surface,
   c. said second pipe having a plain end and a circumferential weldment protruding from its outside surface near said plain end,
   d. said locking segments being installed through said recess and into slidable engagement with the outside surface of said plain end of said second pipe between said weldment and said projection, and thereafter moved out of alignment with said recess, after said contacting surface of said leg portions abut with said first contacting surface of said projection and
   e. said body portion of said locking segments extending into said elongated circumferential groove in the bell portion of said first pipe, whereby said contacting surfaces of said leg portions of said locking segments abut with said first contacting surface of said projection and said contacting surface of said body portion of said locking elements is adapted to abut with said second contacting surface of said projection.

2. The combination of claim 1, wherein said first contacting surface of said projection is frusto-conically shaped and said contacting surface of said leg portion of said locking segment is frusto-conically shaped to abut with said first contacting surface of said projection.

3. The combination of claim 1 wherein said first contacting portion of said projection is concave spherically shaped and said contacting surface of said leg portion of said locking segment is convex spherically shaped.

4. The combination of claim 1 in which said first contacting surface of said projection has two protruding edges with a recess therebetween, and in which a line passing through each of said protruding edges forms an angle with a horizontal plane greater than the angle formed by said contacting surface of said leg of said locking element with a horizontal plane.

* * * * *

UNITED STATES PATENT AND TRADEMARK OFFICE
CERTIFICATE OF CORRECTION

PATENT NO. : 4,540,204

DATED : September 10, 1985

INVENTOR(S) : Billy J. Battle, Robert M. Graham, Lawrence S. Jones, Andrew B. Malizio, George F. Rhodes It is certified that error appears in the above-identified patent and that said Letters Patent is hereby corrected as shown below:

Col. 3, line 50, at end of line, "Face 25" should be --Face 26--.

Col. 4, line 59, "The" should be --the--.

Col. 6, lines 9, 10, and 11, delete "after said contacting surface of said leg portions abut with said first contacting surface of said projection."

Col. 6, line 20, after "projection", insert --after said contacting surface of said leg portions abut with said first contacting surface of said projection--.

Signed and Sealed this

Third Day of February, 1987

Attest:

DONALD J. QUIGG

Attesting Officer

Commissioner of Patents and Trademarks